US010974915B2

(12) United States Patent
Dautz et al.

(10) Patent No.: US 10,974,915 B2
(45) Date of Patent: Apr. 13, 2021

(54) CONSIGNMENT STORE AND METHOD FOR ACCEPTING, TEMPORARILY STORING AND ISSUING CONSIGNMENTS

(71) Applicants: Christoph Dautz, Bonn (DE); Markus von Gostomski, Bonn (DE); Florian Markert, Bonn (DE); Jasmin Quill, Aachen (DE)

(72) Inventors: Christoph Dautz, Bonn (DE); Markus von Gostomski, Bonn (DE); Florian Markert, Bonn (DE); Jasmin Quill, Aachen (DE)

(73) Assignee: Deutsche Post AG Bonn, Bonn (DE)

( * ) Notice: Subject to any disclaimer, the term of this patent is extended or adjusted under 35 U.S.C. 154(b) by 103 days.

(21) Appl. No.: 16/245,015

(22) Filed: Jan. 10, 2019

(65) Prior Publication Data
US 2019/0210818 A1 Jul. 11, 2019

(30) Foreign Application Priority Data
Jan. 10, 2018 (DE) .................... 10 2018 100 448.6

(51) Int. Cl.
*G06F 7/00* (2006.01)
*B65G 57/00* (2006.01)
(Continued)

(52) U.S. Cl.
CPC ............ *B65G 57/005* (2013.01); *B65G 1/04* (2013.01); *B65G 1/10* (2013.01); *B65G 1/14* (2013.01);
(Continued)

(58) Field of Classification Search
CPC .......... B65G 57/005; B65G 1/04; B65G 1/10; B65G 1/14; B65G 2203/0216;
(Continued)

(56) References Cited

U.S. PATENT DOCUMENTS 5,072,573 A 12/1991 Tisma
5,149,240 A 9/1992 Di Rosa
(Continued)

FOREIGN PATENT DOCUMENTS

DE 299 00 899 U1 6/2000
DE 103 49 469 A1 6/2005
(Continued)

*Primary Examiner* — Yolanda R Cumbess
(74) *Attorney, Agent, or Firm* — Reinhart Boenier Van Deuren P.C.

(57) ABSTRACT

Described is a consignment store for the separate acceptance, storing, and issuing of consignments. The consignment store has a handover device for the separate acceptance and handover of the consignments to separate carrier elements, a detecting device for detecting heights of the consignments, and a rack system with holding elements arranged one above the other in a vertical direction and which define holding levels. The holding and carrier elements are of corresponding design such that, on two adjacent holding levels, two carrier elements carrying one consignment can be held one above the other in a vertical direction, and such that, on a holding level, a carrier element can be held with a consignment taller than the spacing to the next holding level. A control device allocates carrier elements in a vertical direction one above the other to different holding elements/storage positions dependent on the detected height of the consignments.

24 Claims, 8 Drawing Sheets

(51) Int. Cl.
*G07F 17/12* (2006.01)
*B65G 1/04* (2006.01)
*G07F 7/00* (2006.01)
*B65G 1/10* (2006.01)
*B65G 1/14* (2006.01)
*G06Q 10/08* (2012.01)

(52) U.S. Cl.
CPC ............... *G07F 7/00* (2013.01); *G07F 17/12* (2013.01); *B65G 2203/0216* (2013.01); *B65G 2203/041* (2013.01); *G06Q 10/08* (2013.01)

(58) Field of Classification Search
CPC ............ B65G 2203/041; B65G 1/0407; B65G 1/1373; G07F 17/12; G07F 7/00; G06Q 10/08
USPC .......................................... 700/213–216, 228
IPC .......................... B65G 57/005,1/04, 1/10, 1/14, 2203/0216, 2203/041, 1/0407, 1/1373; G07F 17/12, 7/00; G06Q 10/08

See application file for complete search history.

(56) References Cited

U.S. PATENT DOCUMENTS

2003/0065421 A1\* 4/2003 Didriksen ............... G07F 17/12
                                                                    700/230
2016/0236866 A1\* 8/2016 Sullivan ................. B65G 1/065

FOREIGN PATENT DOCUMENTS

| | | |
|---|---|---|
| DE | 10 2010 042 617 A1 | 4/2012 |
| EP | 2 876 614 A1 | 5/2015 |
| EP | 3 142 085 A1 | 3/2017 |
| JP | 2-158501 A | 6/1990 |

\* cited by examiner

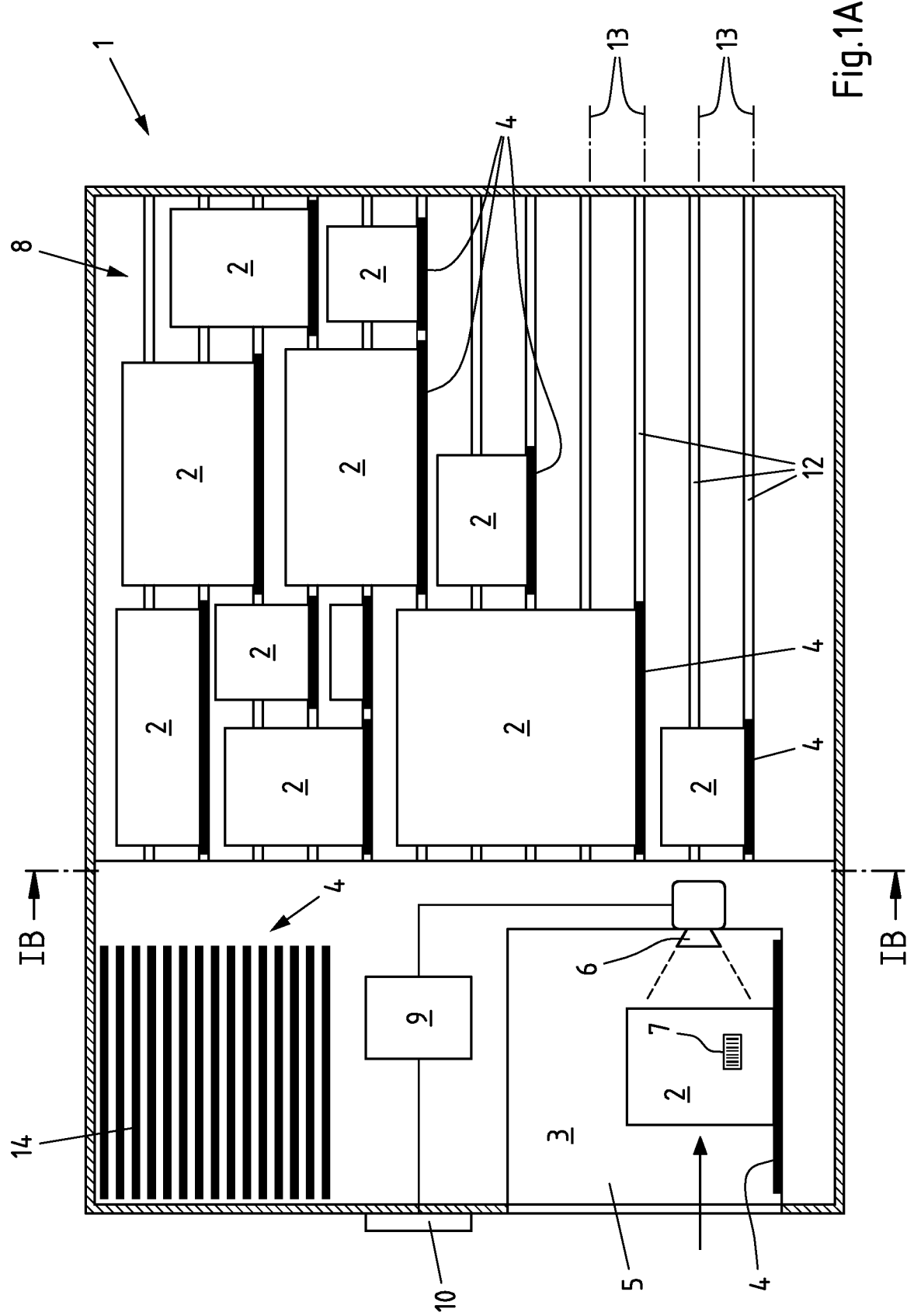

CONSIGNMENT STORE AND METHOD FOR ACCEPTING, TEMPORARILY STORING AND ISSUING CONSIGNMENTS

CROSS-REFERENCE TO RELATED PATENT APPLICATION

This patent application claims priority to German Application No. 10 2018 100 448.6, filed Jan. 10, 2018, the entire teachings and disclosure of which are incorporated herein by reference thereto.

FIELD

The invention relates to a consignment store for the separate acceptance of, temporarily storing and issuing a plurality of consignments which have different dimensions, and to an adapting device for adapting a width dimension and/or length dimension of carrier elements to at least one width dimension and/or length dimension of consignments, which are to be carried by the carrier elements, for a corresponding consignment store. The invention also relates to a method for operating a consignment store for the separate acceptance of, temporarily storing and issuing a plurality of consignments which have different dimensions.

BACKGROUND

Consignment stores and methods for the operation thereof are known in a wide variety of embodiments. In general, consignments are handed over to the consignment store, are temporarily stored in the consignment store, and are subsequently issued again. If the consignments are of different sizes, it is known for the consignments to be allocated to particular storage locations in a manner dependent on their size. To prevent unauthorized access to the consignments, the movement to the storage locations for the temporary storage of the consignments and the subsequent issuing of the consignments can be automated. In this case, it is often sought to utilize the space available for the temporary storage of the consignments as efficiently as possible. Accordingly, consignments are normally assigned to compartments of different size, depending on how large the consignment is. The outlay of the apparatus and the handling effort increases depending on how efficiently the available storage space is utilized. Because of this, it is impossible to achieve fully satisfactory results.

SUMMARY OF SOME EXEMPLARY EMBODIMENTS OF THE INVENTION

The present invention is based on the object of designing and further developing the consignment store, the adapting device and the method in each case of the type mentioned in the introduction and described in more detail above such that the temporary storage of consignments is possible in a space-saving manner and at the same time with little outlay.

Said object is achieved according to the present disclosure by means of a consignment store for the separate acceptance of, temporarily storing and issuing a plurality of consignments which have different dimensions, having a handover device for the separate acceptance of consignments and for the handover of the consignments to separate carrier elements, in particular trays, having a detecting device for detecting height dimensions of the consignments, having a rack system comprising holding elements which are arranged one above the other in a vertical direction and which define holding levels, wherein the holding elements and carrier elements are of corresponding design such that, on the one hand, on at least two adjacent holding levels, two carrier elements carrying in each case one consignment can be held one above the other in a vertical direction, and such that, on the other hand, on at least one holding level, there can be held a carrier element with a consignment taller than the vertical spacing to the next highest holding level, wherein at least one control device is provided for allocating carrier elements, which have consignments, in a vertical direction one above the other to different holding elements and/or storage positions in a manner dependent on the detected height dimensions of the consignments carried by the carrier elements.

The stated object is furthermore achieved according to the present disclosure by means of an adapting device for adapting a width dimension and/or length dimension of carrier elements to at least one width dimension and/or length dimension of consignments to be carried by the carrier elements, wherein the width dimension and/or length dimension of the carrier elements is adjustable by pushing-in of carrier element portions relative to one another, and wherein the adapting device and/or the carrier elements have/has at least one stop for abutment against the associated consignment during the pushing-in of carrier element portions and deactivating means for ending the further pushing-in of the carrier element portions.

The above-stated object is furthermore achieved according to the present disclosure by means of a method for operating a consignment store for the separate acceptance of, temporarily storing and issuing a plurality of consignments which have different dimensions, in which consignments are separately accepted by means of a handover device and are handed over to separate carrier elements, in particular trays,
  in which height dimensions of the consignments are detected by means of a detecting device,
  in which the carrier elements which have consignments are, by means of a control device, in a manner dependent on the detected height dimensions, allocated to holding elements, which define holding levels provided one above the other in a vertical direction, of a rack system such that, on at least some holding levels, carrier elements with a consignment taller than the vertical spacing to the next highest holding level in the vertical direction are arranged one above the other.

The consignment store can be utilized for the separate acceptance of, temporarily storing and issuing a plurality of consignments which have different dimensions. For the acceptance of the consignments by the consignment store, a handover device is used, by means of which the consignments can be accepted separately and in particular in succession. The consignments are, by means of the handover device, handed over in particular in succession to separate carrier elements, such as for example trays. A detecting device is provided which detects at least a height dimension of the consignments. The consignments can thus be transported separately with the carrier elements and in a manner dependent on the respective height dimension to the storage location in a rack system.

The rack system has holding elements which are arranged one above the other in a vertical direction and which each define holding levels arranged one above the other. The holding elements are designed such that a carrier element with a consignment can be arranged on each holding level, one above the other in a vertical direction. The holding elements are however designed such that, on at least some holding levels, there can be arranged carrier elements with a consignment which is taller than the vertical spacing to the next highest holding level in the vertical direction, without colliding with the holding element of the next highest holding level. A control device is also provided which assigns the carrier elements, which have consignments, to different holding elements and/or storage positions in a manner dependent on the detected height dimensions of the consignments carried by the carrier elements one above the other in the vertical direction.

For example, a carrier element is assigned to a holding level such that the carried consignment just fits under a further carrier element. This means for example that, between the carrier element and the consignment arranged vertically therebelow, there is a vertical spacing smaller than the spacing between the holding level of the upper carrier element and the next holding level arranged therebelow. It is thus also possible for a consignment with the associated carrier element to be positioned between two other consignments in the rack system such that the storage space in the vertical direction is utilized as completely as possible. Since the height dimension of the respective consignment and that of the carrier element is known, the control device can calculate a space-saving arrangement of the corresponding carrier elements in the rack system.

In order that the consignments can also be arranged in a space-saving manner adjacent to one another in a horizontal direction, for example in a common holding level, the dimension of the carrier elements in at least one direction can be adapted to the dimensions of the consignments. For this purpose, use may be made of an adapting device which serves for adapting a width dimension and/or length dimension of carrier elements to at least one width dimension and/or length dimension of a consignment which is being carried or is to be carried by the respective carrier element. The width dimension and/or length dimension of the carrier elements can be easily adjusted by pushing-in of carrier element portions relative to one another. The adapting of the carrier elements to the consignments may be performed such that the adapting device and/or the corresponding carrier element has at least one stop for abutment against the associated consignment. If the carrier elements are now pushed in relative to one another in at least one direction, the at least one stop abuts against the consignment at some point in time. As a result of this abutment, the further pushing-in of the carrier element portions relative to one another can be ended. For example, a contact sensor may detect the contact with the consignment, or a distance sensor may be utilized in order to detect the distance to the consignment. It is however also possible for a power, a force and/or a torque of the motor drive for the pushing-in of the carrier element portions relative to one another to be detected. If it is detected that, preferably, a particular threshold value is exceeded as a result of the abutment of the at least one stop against the consignment, the further pushing-in of the carrier element portions relative to one another can be ended by a control device or automatically.

In this context, it is self-evident that the carrier elements can be pushed in relative to one another preferably in one direction and/or in two mutually perpendicular directions. This is however not imperative. The carrier elements can also be pulled out again in the opposite direction or the opposite directions. It is thus possible for the carrier elements to subsequently be utilized again for receiving further consignments, that is to say to be reused. It may be preferable for at least one carrier element portion to be pushed into a corresponding carrier element portion in order to reduce the width and/or the length of the carrier element. This, too, is however not imperative. The carrier element portions may also be connected to one another so as to be displaceable relative to one another without engaging into one another. The carrier element portions may thus for example be pushed over one another and/or compressed, for example pushed together or folded together.

In the present case, consignments are basically to be understood to mean different articles which can preferably be transported with reasonable effort. In particular, the consignments may be in the form of piece goods. These may involve articles relating to daily requirements, such as consumable materials or foodstuffs, as well as technical articles and equipment. In many cases, the consignments are consignments of a postal company, which can be referred to as postal consignments. As required, the consignments are letter consignments, package consignments and/or flyers. Package consignments also encompass packets, whereas flyers may also be catalogues, brochures and magazines. A letter consignment may be not only a letter but also a postcard. Package consignments and other consignments are in many cases packaged items, wherein the consignment then encompasses the packaging and the item packaged therein.

For the sake of improved understanding and in order to avoid unnecessary repetitions, the consignment store, the adapting device and the method will be described jointly below, without a distinction being made in each case in detail between the consignment store, the adapting device and the method. It is however obvious to a person skilled in the art from the context which feature is particularly preferred in each case with regard to the consignment store, the adapting device and the method.

In a first particularly preferred refinement of the consignment store, an adapting device for adapting a width dimension and/or length dimension of the carrier elements to at least a width dimension and/or length dimension of the associated consignments is provided. Said adapting device is preferably an adapting device of the type described above. By means of the adapting device, it can be ensured that even narrow and/or short consignments can be temporarily stored with an extremely small spacing to one another in the rack system without the carrier elements undesirably impeding one another or colliding with one another. With regard to the carrier elements and/or with regard to the adapting device, it is particularly expedient from a construction aspect if the width dimension and/or length dimension of the carrier elements is adjustable by pulling out and/or pushing in carrier element portions relative to one another. To ensure that the width dimension and/or length dimension of the carrier elements are not excessively reduced relative to the respective consignment, that is to say so as not to jeopardize reliable carrying of the consignments by the carrier elements, the adapting device and/or the carrier elements may have at least one stop for abutment against the associated consignment during the pushing-in of carrier element portions and deactivating means for ending the further pushing-in of the carrier element portions. The further pushing-in of the carrier element portions may selectively be ended already before the stop makes contact with the consignment and/or only after the stop has made contact with the consignment. This is then dependent on how the contact or the impending contact of the stop with the consignment is detected or monitored. For example, if distance sensors or proximity sensors are used, the pushing-in of the carrier elements may be ended already before the consignment abuts against a stop. However, the abutment and a deactivation of the pushing-in of the carrier elements only after contact between consignment and stop may additionally be taken as a basis if the distance sensor or proximity sensor is not functioning as desired.

In particular if the width dimensions and/or the length dimensions of the carrier elements are adapted to the dimensions of the consignments, it is expedient if the control device is designed to allocate carrier elements, which have consignments, to storage positions. In particular, the carrier elements may thus be allocated to a common holding level, specifically in a manner dependent on the width dimension and/or length dimension of the carrier elements and/or of the consignments adjacent to one another. For this purpose, the control device receives pieces of information relating to the corresponding width dimension and/or length dimension and furthermore pieces of information relating to the storage locations that are still available and/or those that are already occupied. This makes it possible for the control device to then arrange the corresponding carrier elements extremely closely adjacent to one another without the carrier elements or consignments colliding and without too much storage space being left unutilized in between.

The efficient utilization of the storage space however need not be restricted to the placing of new consignments into the store. Rather, storage space is freed up again as a result of the issuing of consignments. More efficient utilization of the storage space may, as required, also be achieved by virtue of the carrier elements of the rack system being at least partially resorted. For example, a larger coherent storage space can be provided, in which consignments can subsequently be temporarily stored with high flexibility again without unnecessarily leaving storage space unutilized. The control device can thus, for more efficient utilization of the storage space, be designed to adjust at least one carrier element carrying a consignment from one storage position to another storage position.

Alternatively or in addition, the control device may be designed to link pieces of consignment information, height dimensions, width dimension and/or length dimension of the consignments, to the carrier elements assigned to the consignments and/or to the storage positions assigned to the consignments and/or carrier elements. It is thus possible, for example, for a particular consignment to be reliably issued again. This is the case in particular if consignment information is assigned to the associated carrier element and the control device is informed of the present storage position of the corresponding carrier element. Alternatively or in addition, it is also possible for the pieces of consignment information to be assigned to the respective storage positions of the carrier elements carrying the consignments. Then, too, the control device knows at all times what storage position the carrier element that is carrying a particular consignment is situated at. Items of consignment information may for example relate to and/or designate the addressee of the consignment and/or the user of the consignment. The consignment information may alternatively or additionally also involve a preferably individual consignment code and/or further pieces of information. If height dimensions, width dimension and/or length dimension of the consignments with carrier elements and/or the storage positions assigned to the consignments and/or carrier elements are to be linked, it is easy for the control device to determine what locations in the rack system storage space is still available at for the temporary storage of further consignments. The more comprehensively the dimensions of the corresponding consignments are known, the more accurately the control device can determine how large the loading space still available at particular locations in the rack system is. Accordingly, it is also possible for the loading space of the rack system to be utilized more efficiently.

For the simple and reliable detection of dimensions of the consignments, the detecting device may have a dimension scanner for detecting height dimensions, width dimension and/or length dimension of the consignments. The dimension scanner may for example detect the corresponding dimension by means of at least one optical sensor. It is however also possible for at least one distance sensor, one inductive sensor and/or one capacitive sensor to be utilized. Alternatively or in addition, the detecting device may have a scanner which reads out pieces of consignment information stored in a memory provided on the consignment. Depending on the type of memory, the scanner may for example be an optical sensor, a barcode scanner, an RFID reader unit and/or an NFC reader unit for detecting pieces of consignment information, preferably relating to the addressee, the user, a preferably individual consignment code, the height dimension, the width dimension and/or the length dimension. In the case of the height dimension, the width dimension and/or the length dimension, this can thus be detected at another location and written into the memory, for example a barcode, on the consignment. The height dimension, the width dimension and/or the length dimension of the consignment can then be obtained by reading out the memory, without the need for the at least one dimension of the consignment to actually be determined using measuring technology.

To be able to transport the carrier elements carrying consignments from the handover device to the corresponding storage positions in the rack system and/or to be able to transport the corresponding carrier elements from the storage positions back to the handover device, a transport device may be provided. For the sake of simplicity in terms of construction and flexible handling of the carrier elements, it is expedient if the transport device has a portal robot for adjusting the carrier elements in at least two mutually perpendicular spatial directions. The portal robot can ultimately move quickly and precisely to very different storage positions in order to store and/or retrieve carrier elements there. Consequently, it is particularly expedient if the portal robot is designed for handing over the carrier elements to the holding elements and/or for removing the carrier elements from the holding elements.

The holding elements which define the holding levels may basically be designed in a variety of ways. For example, if use is made of pivot arms for pivoting out into a use position and for pivoting in into a non-use position, provision may be made for one pivot arm, two pivot arms or a number of pivot arms adapted to the width dimension, length dimension and/or height dimension of the consignment to carry the corresponding carrier element. It may also be preferable if the holding elements that define the holding levels are displaceable between multiple use positions and/or between at least one use position and at least one non-use position, and/or that the holding elements which define holding levels are dismountable. Then, the holding elements can be displaced to or mounted at the location where a carrier element is to be held in the rack system. It is possible for the number and arrangement of the carrier elements to be adapted to the size of the corresponding consignment or the carrier element. The larger the consignment or the carrier element is, the greater the number of holding elements that is used may be. Provision may however also be made for the type of holding elements used to be adapted to the size of the consignment or of the carrier element. With increasing size, it is thus possible, for example, for larger and/or more stable holding elements to be used. Holding elements that have to be adjusted from a non-use position into a use position, like separate holding elements that must first be mounted at the correct location in the rack system, nevertheless require relatively great outlay, specifically from a construction aspect and with regard to the implementation of the corresponding method.

It is therefore particularly simple and flexible if the holding elements which define the holding levels are formed by receptacles for receiving carrier elements carrying consignments. The receptacles may be designed such that unused receptacles do not impede the temporary storage of consignments in the rack system, for example because they collide neither with the adjacent consignments nor with the adjacent carrier elements in the rack system. This can be realized in a particularly simple and expedient manner if the receptacles are in the form of grooves. For the sake of simplicity, the receptacles, in particular the grooves, may be designed for receiving carrier elements, carrying consignments, in positively locking fashion. It is thus for example possible for a carrier element to be inserted by way of one of its edges into the receptacle, in particular the groove, where the carrier element is then held in position in positively locking fashion of its own accord. To be able to also position the consignments or carrier elements adjacent to one another in the rack system in a highly flexible manner with regard to the sizes of the consignments, it is expedient if the at least one holding level, preferably all of the holding levels, are/is defined by a single continuous receptacle and/or groove. The carrier elements can then be positioned not only at particular predetermined locations in a holding level but at a very large number of different locations. In particular, continuously variable positioning of the carrier elements along the holding level is possible.

It is particularly simple if the carrier elements are designed to be pushed horizontally into the holding elements, in particular into the grooves, and to be pulled horizontally out of the holding elements again. In this context, positive locking is required only in a vertical direction. Provision may however also be made for the carrier elements to be mounted in the holding elements such that the holding elements are held in positively locking fashion in the holding element both horizontally and vertically. For the removal of the carrier element, the latter must then firstly be lifted, in order to overcome the horizontal positive locking, before it can be pulled horizontally out of the holding element. The carrier elements may for example have head elements or U-shaped holding strips for the connection to the holding element.

If the handover device is designed for separately issuing consignments stored with carrier elements in storage positions, the consignments can be accepted into the consignment store in one sequence and issued from the consignment magazine again in a different sequence. In other words, the placement of a consignment into storage and/or the removal of a consignment from storage can be performed independently of the placement into storage and/or removal from storage of a preceding and/or subsequent consignment.

In order that carrier elements which are not required do not restrict the available storage space, it may be expedient if the consignment store comprises a carrier element store for temporarily storing unused carrier elements.

In a first particularly preferred refinement of the method, a width dimension and/or length dimension of the carrier elements is adapted in an adapting device to a width dimension and/or length dimension of the associated consignments. In simple terms, the carrier elements are thus reduced in size to such an extent that they can still reliably carry the consignments. At the same time, it is made possible for a further adjacent carrier element to be able to be placed very close to the corresponding consignment in the rack system without an undesired collision with a carrier element occurring. For this purpose, it is expedient if the width dimension and/or length dimension of the carrier elements is adjusted by pulling-out and/or pushing-in of carrier element portions relative to one another. It is thus preferably possible for the carrier element portions to be pushed in until at least one stop of the adapting device and/or of the carrier element abuts against the associated consignment, and a deactivating means ends the further pushing-in of the carrier element portions. The further pushing-in of the carrier element portions relative to one another may also be ended before the stop means actually abut against the consignment, for example if a suitable distance sensor or proximity sensor is provided which identifies whether a threshold distance between the stop, distance sensor or proximity sensor, on the one hand, and the consignment, on the other hand, is undershot. As required, the threshold distance may be selected to be very small such that, when the threshold distance is undershot, contact between the consignment and the stop, distance sensor or proximity sensor is so closely imminent that such, in particular light, contact may at least occasionally occur.

A space-saving arrangement of the consignments and carrier elements adjacent to one another can be achieved in that the carrier elements which have consignments are, in a manner dependent on the width dimension and/or length dimension of the carrier elements and/or of the consignments, allocated by the control device to particular storage positions adjacent to one another. If the carrier elements are allocated in the above-described manner to a common holding level, the carrier elements can be positioned very close together in one and the same holding level, in order firstly to save storage space and secondly to prevent a collision of the adjacent carrier elements.

To be able to provide a space-saving arrangement of the carrier elements and of the consignments in the rack system not only during the acceptance of new consignments but also during the issuing of consignments from the rack system, the carrier elements of the rack system may, at suitable times, be resorted as required, for example in order to generate larger coherent regions of free loading space in the rack system. In other words, at least individual carrier elements carrying consignments may, with regard to the respective storage positions, be resorted in a manner predetermined by the control device for the purposes of more efficiently utilizing the available storage space.

The handling of the consignments can be performed more reliably and in a more space-saving manner if pieces of consignment information, height dimensions, width dimension and/or length dimension of the consignments are assigned by the control device to the carrier elements assigned to the consignments, and/or to the storage positions assigned to the consignments and/or carrier elements. It is then always known what location in the rack system a particular consignment is situated at, or what dimensions said consignments have.

The height dimensions, width dimension and/or length dimension of the consignments being handed over to the consignment store can be detected very easily and reliably by means of a dimension scanner. This may for example be performed optically, for example using a camera, inductively or capacitively. Corresponding sensors and evaluating devices are available on the market.

Alternatively or in addition, it is also possible for pieces of consignment information, preferably relating to the addressee, the user and/or a preferably individual consignment code, height dimensions, width dimension and/or length dimension of the consignments being handed over to the consignment store to be detected by means of a scanner, in particular barcode scanner, RFID reader unit and/or NFC reader unit, of the detecting device. The corresponding pieces of information may, for this purpose, be written into a memory, for example in the form of a barcode, in advance and then read out by means of the detecting device.

To be able to transport the carrier elements, which have the consignments, from the handover device to storage positions and/or back, a transport device may be used. This is easy to realize. This is the case in particular if the carrier elements are moved by means of a portal robot of the transport device at least in two mutually perpendicular spatial directions. Alternatively or in addition, the portal robot can easily and reliably hand over the carrier elements to holding elements in accordance with the predetermined storage position and/or take the carrier elements from the corresponding holding elements for the issuing of consignments. Portal robots are known and are reliable and inexpensive to purchase.

The carrier elements can, as required, be handed over to the holding elements, which define holding levels, in the form of pivot arms, which hold the carrier elements securely in a use position and can be pivoted out of the way, into a non-use position, as required. Provision may consequently be made for the pivot arms to be pivoted back and forth between a use position and a non-use position. It is thus possible for the pivot arms, in the non-use position, to not unduly adversely affect the arrangement of carrier elements and consignments in the rack system.

The holding elements which define holding levels may alternatively or additionally also be displaced back and forth between multiple use positions for holding carrier elements and/or between at least one use position for holding a carrier element and at least one non-use position for avoiding unnecessary blockage of the storage space. It is thus possible, for example, to achieve high flexibility with regard to the possible storage positions of the carrier elements without the need to accept the outlay in terms of apparatus required to provide a very large number of holding elements in a static manner in the rack system. The holding elements can, as required, be dismounted when they are not needed, and mounted again at the location at which they are needed. If different types of dismountable holding elements are provided, it is possible for a suitable holding element to be provided for mounting in accordance with the consignment to be held or in accordance with the carrier element to be held. This selection of the holding element may for example be performed in accordance with the size and/or weight of the consignment and/or the size of the carrier element to be held. The holding elements that define the holding levels can be repeatedly mounted in at least one use position in order to hold a carrier element and dismounted in order to avoid unnecessary blockage of the loading space.

It is particularly simple if the carrier elements carrying consignments are, at least in portions, introduced into the holding elements which define holding levels and which are in the form of receptacles, in particular in the form of grooves. The carrier elements can then be held there in particular in positively locking fashion. Separate handling of holding elements, for example the mounting or pivoting of holding elements, can then be omitted, which simplifies the method.

The carrier elements may then, as required, be simply pushed horizontally into the holding elements, in particular into the grooves, and pulled horizontally out of the holding elements again. The carrier elements are then for example held in positively locking fashion in the holding element only in the vertical direction. If the carrier elements are mounted in the holding elements, the holding elements can be held in positively locking fashion in the holding element both horizontally and vertically. For the removal of the carrier element, the latter must then firstly be lifted, in order to overcome the horizontal positive locking, before it can be pulled horizontally out of the holding element. The carrier elements may for example have head elements or U-shaped holding strips for the connection to the holding element.

The consignments stored with the carrier elements in storage positions can preferably be issued separately by means of the handover device. It is thus possible for the same handover device to be used both for accepting and for issuing the consignments. It is however also possible, for example in order to permit accepting and issuing of consignments in parallel, to utilize two different handover devices, specifically for example one always for accepting the consignments and the other always for issuing the consignments.

To save further space and simplify the method, it is possible for unused carrier elements to be temporarily stored in a carrier element store until they are used again.

BRIEF DESCRIPTION OF THE DRAWINGS

The invention will be discussed in more detail below on the basis of a drawing, which illustrates merely exemplary embodiments. In the drawing:

FIGS. 1A-B show a first consignment store according to the invention in a schematic side view and a schematic plan view.

DETAILED DESCRIPTION

Figure 1B:
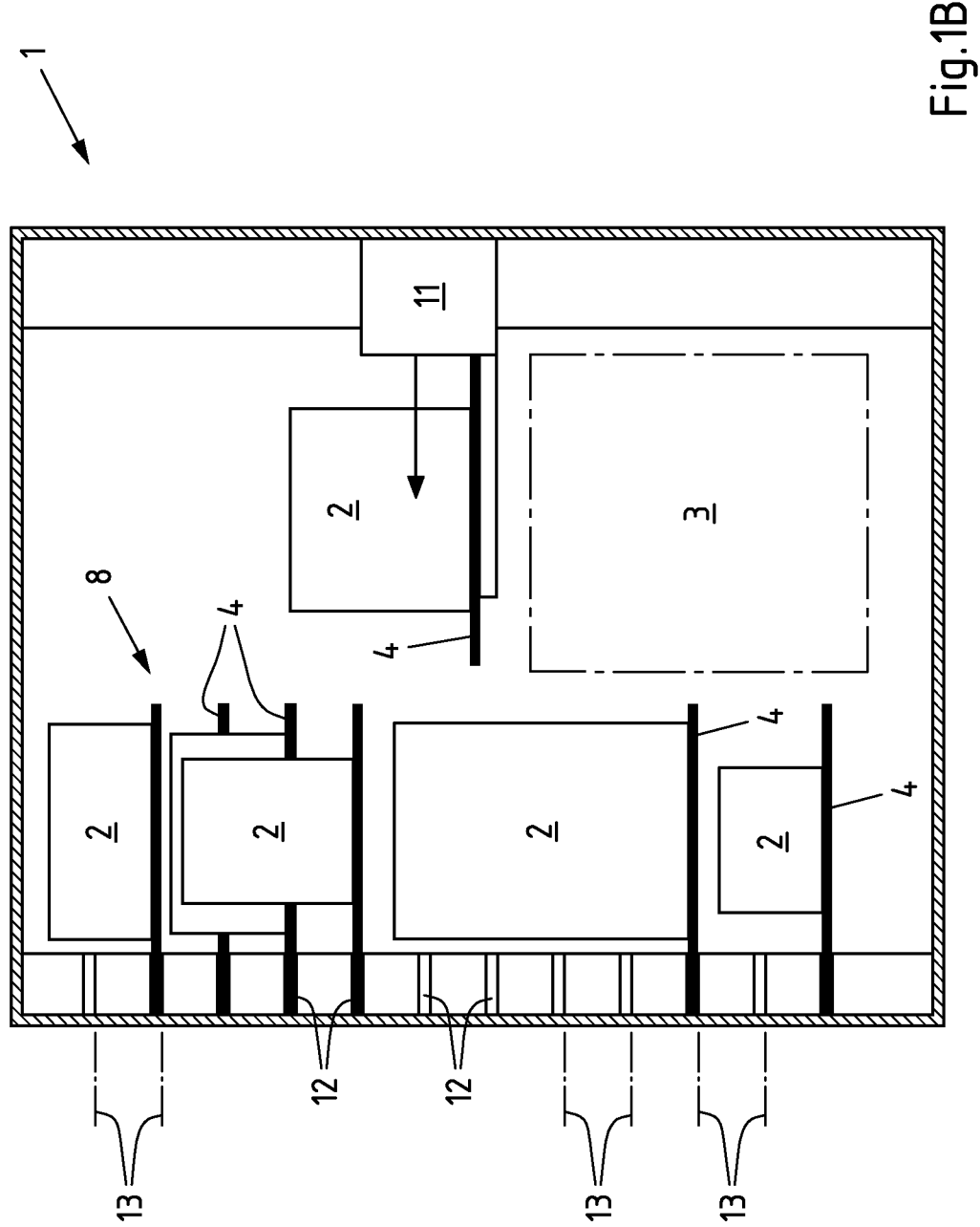

FIGS. 1A-B illustrate a consignment store 1 for accepting, temporarily storing and reissuing consignments 2. The consignments 2 are, in order to be accepted by the consignment store 1, handed over to a handover device 3. There, a carrier element 4 in the form of a tray is already present, onto which the consignment 2 to be accepted is placed in the handover device 3 via an opening 5 in the consignment store 1. A detecting device 6 then, for example by means of at least one optical sensor, detects a height dimension of the consignment 2 and pieces of consignment information, for example relating to the addressee or a consignment code. The detecting device 6 may in this case comprise at least one sensor or scanner, which may as required be optical. The pieces of consignment information serve for example for achieving that a very particular consignment 2 can always be issued from the consignment store 1 again, and said pieces of consignment information may be stored for example in a barcode 7 on the consignments 2. It is also conceivable for the pieces of consignment information to be stored in a Radio Frequency Identification tag (RFID tag) or a Near Field Communication tag (NFC tag) attached to the consignment. Read-out devices for such tags are known and available and may for example use a local radio network.

The detecting of the height dimension serves for the space-saving arrangement of the consignment 2 and of the carrier element 4 in at least one rack system 8 of the consignment store 1. The height dimension and the consignment information are received and processed by a control device 9 for controlling the consignment store 1. In order that the consignments 2 can be placed in the handover device 3 in any orientation, at least one detecting device 6 may be arranged at multiple sides of the handover device 3 as required. Alternatively or in addition, the pieces of consignment information may also be transmitted by means of an operator control panel 10 or electronically. In the case of the electronic transmission of the pieces of consignment information, these may be transmitted for example in the form of a code. The transmission may be performed, as required, via a local radio network or a mobile radio network, in particular Global System for Mobile Communication (GSM), Universal Mobile Telecommunications System (UMTS) and/or Long Term Evolution (LTE), Bluetooth or Wireless Local Area Network (WLAN).

After the acceptance of consignments 2 by the carrier elements 4, at least one width dimension of the carrier elements 4 is, as required, reduced until the corresponding width dimension has been adapted in a predetermined manner to the width dimension of the associated consignment 2. Provision may for example be made for the width of the carrier elements 4 to at least substantially correspond to the width of the associated consignments 2, or to be only slightly greater, in particular by a particular amount, than the corresponding width of the associated consignments 2.

After the width of the carrier element 4 has been adapted in the manner described above to the width of the consignment 2, the carrier element 4 is taken hold of by a transport device 11, which in the illustrated and thus preferred exemplary embodiment is a portal robot which can perform movements in three mutually perpendicular spatial directions. The transport device 11 is controlled by the control device 9 which, on the basis of the height dimension of the consignment 2 and the width dimension of the consignment 2, determines a suitable free storage location for the consignment 2 in the rack system 8 of the consignment store 1. On the basis of the height dimension and the width dimension of the consignment 2, it is determined how much space, at least in two spatial directions, in particular horizontally in the width direction and vertically, must be available in the rack system 8 for the consignment 2. It is also taken into consideration that the consignment 2 or the carrier element 4 can be positioned not at arbitrary positions but only at particular storage positions in the rack system 8. These storage positions are determined by holding elements 12 which define different holding levels 13 arranged vertically one above the other.

In the illustrated consignment store 1, the holding elements 12 are formed by receptacles in the form of grooves which extend continuously at least substantially over the width of the rack system 8. The holding elements 12 are oriented preferably horizontally. The carrier elements 4 can be positioned at any desired storage positions along the holding elements 12. In a vertical direction, however, the carrier elements 4 can be positioned only at the corresponding holding levels 13 in the holding elements 12. In the illustrated consignment store 1 this is realized by virtue of the carrier element 4 being inserted into the holding elements 12 in the form of a receptacle or groove. The vertical extent of the carrier element 4 is preferably slightly smaller than the vertical extent of the holding elements 12. The carrier element 4 is thereafter held in positively locking fashion in the holding element 12. The transport device 11 can thus be released from the carrier element 4, and for example move a further carrier element 4 to its storage position predetermined by the control device 9. The control device 9 predetermines the respective storage positions such that the available storage space of the rack system 8 is utilized as effectively as possible. This means that the control device 9 has pieces of information regarding which carrier element 4 with which consignment 2 is stored at which storage position in the rack system 8. If this is known, it is also known which spaces of the rack system 8 are still free.

The issuing of consignments 2 is performed by virtue of the control device 9 being triggered to issue a particular consignment 2 or to issue particular consignments 2. This may be performed through the inputting of information linked to the respective consignment 2, in particular through the inputting of a code, for example on the operator control panel 10 of the consignment store 1. Alternatively or in addition, the information for issuing may also be transmitted by way of electronic transmission, as required via a local radio network or a mobile radio network, in particular Global System for Mobile Communication (GSM), Universal Mobile Telecommunications System (UMTS) and/or Long Term Evolution (LTE), Bluetooth or Wireless Local Area Network (WLAN). The information linked to at least one consignment 2, for example in the form of a code, is received by the control device 9, which is informed of the storage position of the carrier element 4 carrying the corresponding consignment 2. Consequently, the control device 9 can instruct the transport device 11 to take hold of the carrier element 4 situated at the corresponding storage position and move said carrier element to the handover device 3.

At the handover device 3, the corresponding consignment 2 can then be received by a retrieving person. The carrier element 4 preferably remains in the handover device 3 for the purposes of receiving a further consignment 2, or is temporarily stored in the carrier element store 14 until it is required again for the storage of a consignment 2 in the consignment store 1. It is thus also possible for multiple consignments 2 to be issued in succession without the carrier elements 4 accumulating in the handover device 3. At the latest in the case of multiple consignments 2 in succession being handed over to the handover device 3 in order to be temporarily stored in the consignment store 1, it is possible, as required, at least for the acceptance of the second and every further consignment 2, for a carrier element 4 to be taken from the carrier element store 14 and moved into the handover device 3 in order to receive a consignment 2.

If the control device 9 detects that, as a result of repeated acceptance and issuing, numerous storage positions for receiving only narrow or small consignments 2 are available in the rack system 8, the control device 9 can, in part, resort the carrier elements 4 and allocate these to a different storage position, to which the corresponding carrier elements 4 are then moved by means of the transport device 11. It is thus possible to create spaces in the rack system 8 for receiving taller and/or wider consignments 2, for example in situations in which such consignments 2 are to be stored. The described resorting may be performed as required during a time in which the consignment store 1 has not been commanded to issue a consignment 2 and does not have a consignment 2 in the handover device 3 to be stored in the consignment store 1.

To accelerate the accepting and issuing of consignments 2, it is also possible, instead of a single handover device 3, for multiple, in particular two, handover devices to be provided. Alternatively or in addition, for the same reason, it is possible, instead of a single transport device 11, for multiple, in particular two, transport devices to be provided, which may preferably each be a portal robot.

Figure 2A:
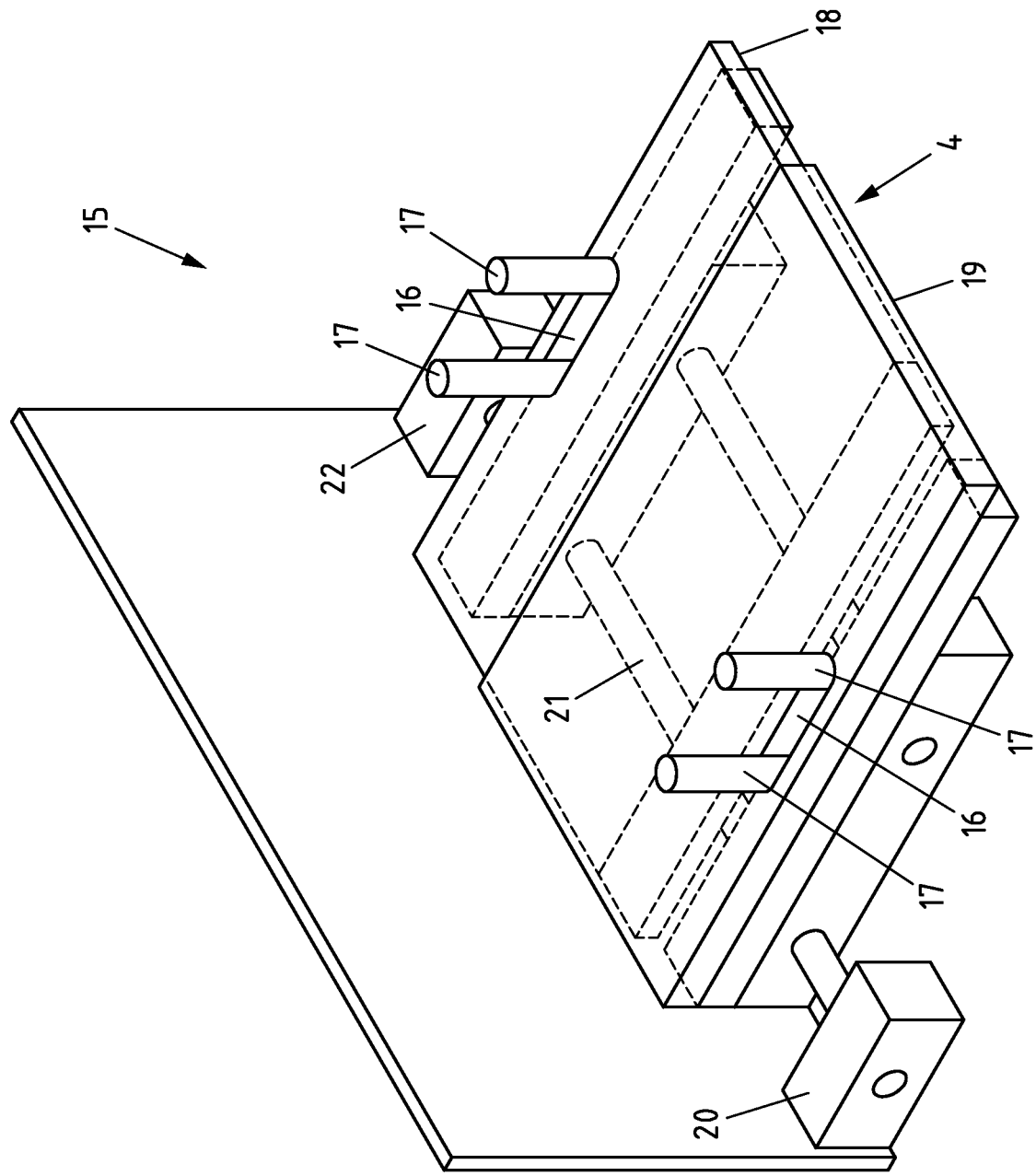
FIGS. 2A-B show an adapting device of the consignment store from FIG. 1 and an associated carrier element, in each case in a perspective view and in a sectional view.
Figure 2B:
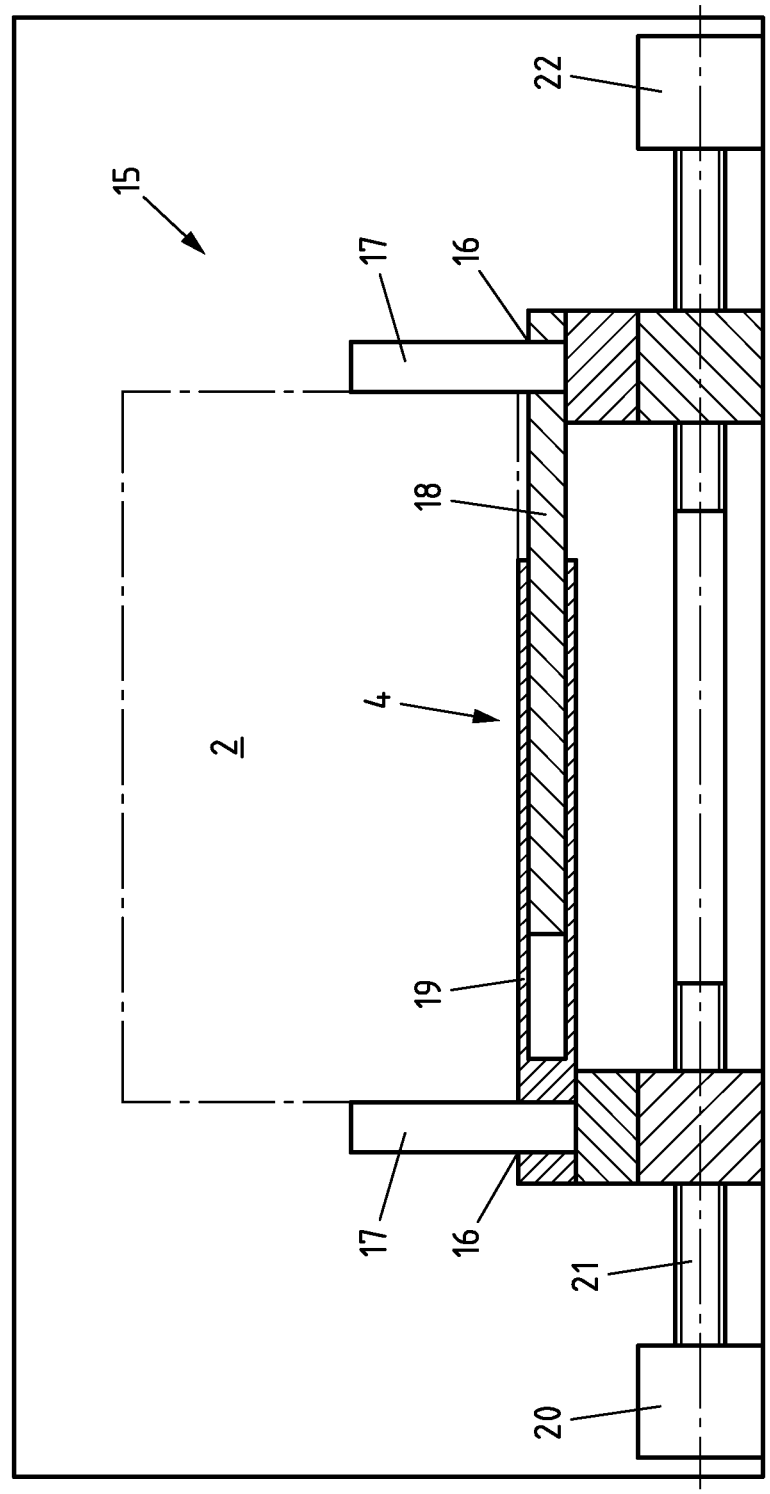

FIGS. 2A-B illustrate the adapting device 15 of the consignment store from FIG. 1, with which the width of the carrier elements 4 is adapted to the width of the consignments 2 received in the handover device 3. The adapting device 15 is, in the illustrated consignment store 1, integrated into the handover device 3, though could alternatively also be provided separately. The carrier elements 4 have apertures 16 through which stops 17 of the adapting device 15 engage and protrude upward relative to the carrier element 4. This, too, is not imperative, if for example the stops 17 were provided laterally adjacent to the carrier elements 4. The carrier elements 4 have two carrier element portions 18, 19. It would however basically also be possible for multiple carrier element portions to be realized. The carrier element portions 18, 19 can be pushed together and pulled apart again, and in the process one carrier element portion 18 is partially received in the other carrier element portion 19, which is preferred but not imperative. As a result of the carrier element portions 18, 19 being pushed into one another, the width of the carrier element 4 is reduced overall.

The pushing-together of the carrier element 4 is performed by means of an electromotive drive 20, which for example comprises a spindle drive with a spindle 21 or may be designed as a linear drive. If the carrier element portions 18, 19 are pushed one into the other, the stops 17 abut from opposite sides, at some point in time, against the consignment 2 resting on the carrier element 4. The resistance that the electromotive drive 20 must overcome in order to push the carrier element 4 together further then increases. A deactivating means 22 or closed-loop controller deactivates the electromotive drive 20 and ends the pushing-together process. The width dimension to which the carrier element 4 has been pushed together is detected, for example, based on the position of the spindle 21. This information is processed by the control device 9 in order to allocate to the carrier element 4 a storage position in the rack system 8 which is wide enough to receive the carrier element 4. The control device 9 ensures that the storage position is assigned enough space to accommodate the carrier element 4 and the corresponding consignment 2 therein. It is also possible for distance or proximity sensors to be attached to the stops 17 to end the pushing-together of the carrier element 4 before the stops 17 abut against the consignments 2.

Figure 3A:
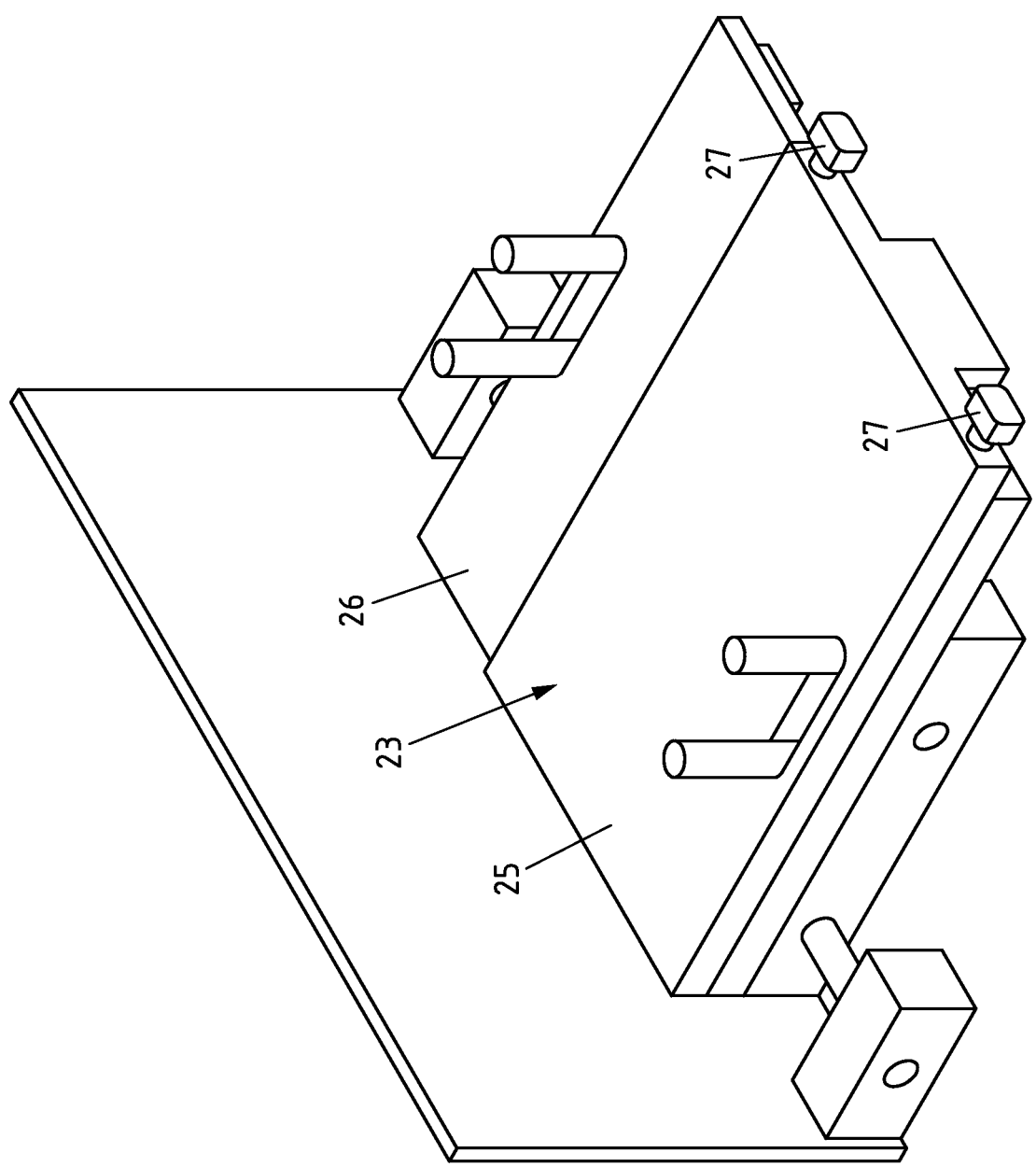
FIGS. 3A-B show an adapting device with an alternative carrier element and a detail of a rack system of in each case one second consignment store according to the invention in a perspective view.
Figure 3B:
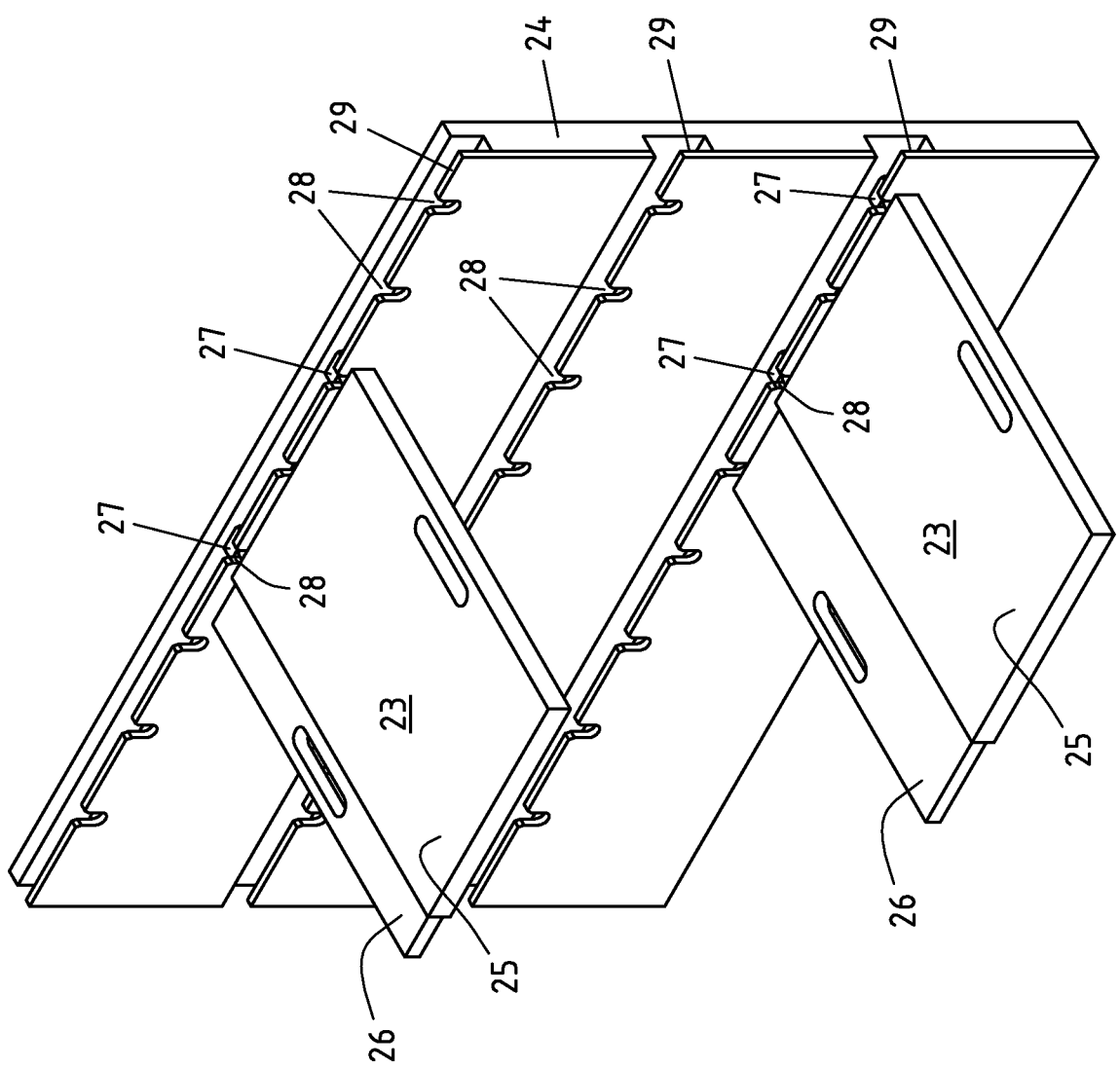

FIGS. 3A-B illustrate alternative carrier elements 23 and alternative rack system 24. The carrier elements 23 have two carrier element portions 25, 26, of which one carrier element portion 28 has two stud elements 27 protruding both rearwardly and parallel to the carrier element 23. Said stud elements can be engaged in positively locking fashion into corresponding slots 28 of the holding elements 29, which slots are provided so as to be distributed at regular intervals along the holding elements 29. The stud elements 27 must then be lowered into the holding elements 29, and, for the removal of the carrier element 23, initially moved upward again before the carrier element 23 can be pulled horizontally out of the holding element 29. Thus, inadvertent slippage of the carrier elements 23 out of the holding elements 29 is avoided, but the carrier elements 23 can be arranged only in a particular raster of the rack system 24. This is not the case with the holding elements 12 in the form of continuous grooves as in the rack system 8 shown in FIGS. 1A-B in which the carrier elements 4 can be positioned adjacent to one another in continuously variable fashion in the groove-like holding elements 12.

Figure 4B:
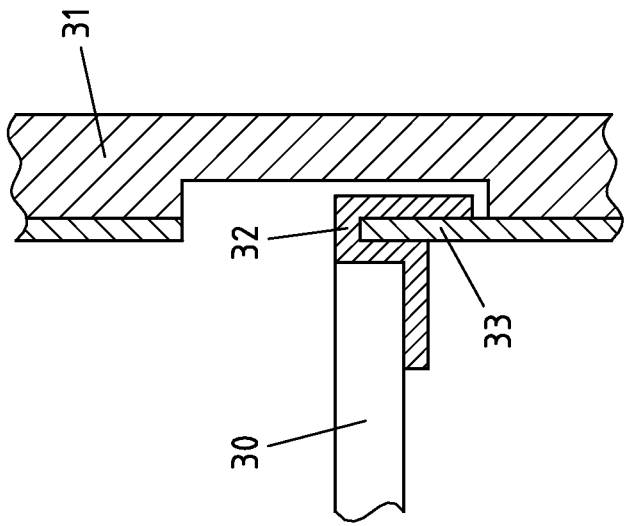
FIGS. 4A-B show a detail of a rack system of a third consignment store according to the invention in a perspective view and in a sectional view.
Figure 4A:
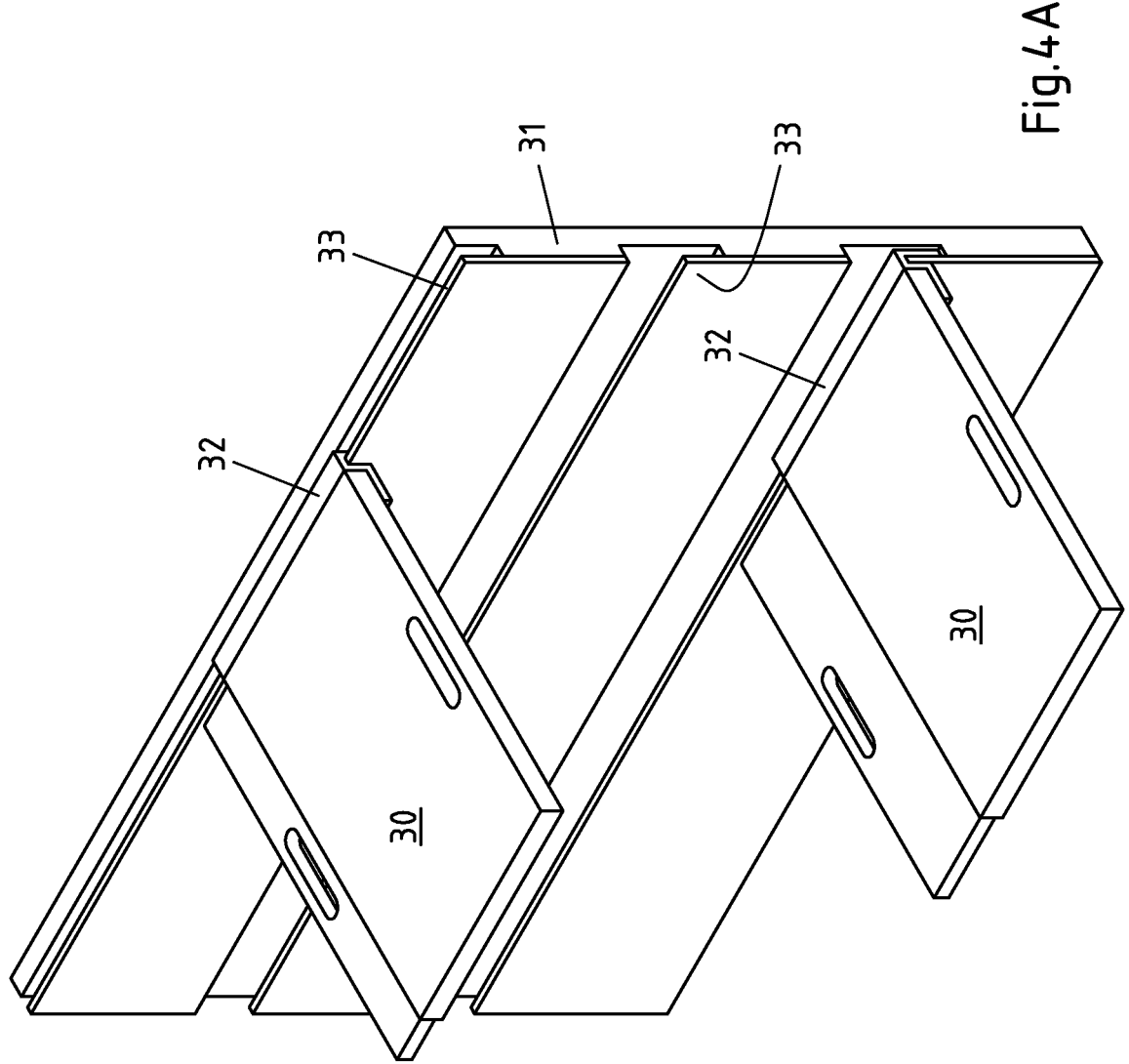

FIGS. 4A-B illustrate alternative carrier elements 30 and alternative rack systems 31. The carrier elements 30 have U-shaped holding strips 32 which are configured to be mounted onto the holding elements 33 of the associated rack system 31, in the form of continuous ribs. This embodiment of carrier element 30 and rack system 31 constitutes a compromise between the embodiments as per FIGS. 1A-B and 3A-B. The carrier elements 30 can, without regard to a raster, be fixed adjacently to one another to a holding element 33, wherein the carrier elements 30 are simultaneously secured against inadvertently slipping out of the rack system 31 horizontally.

Figure 5:
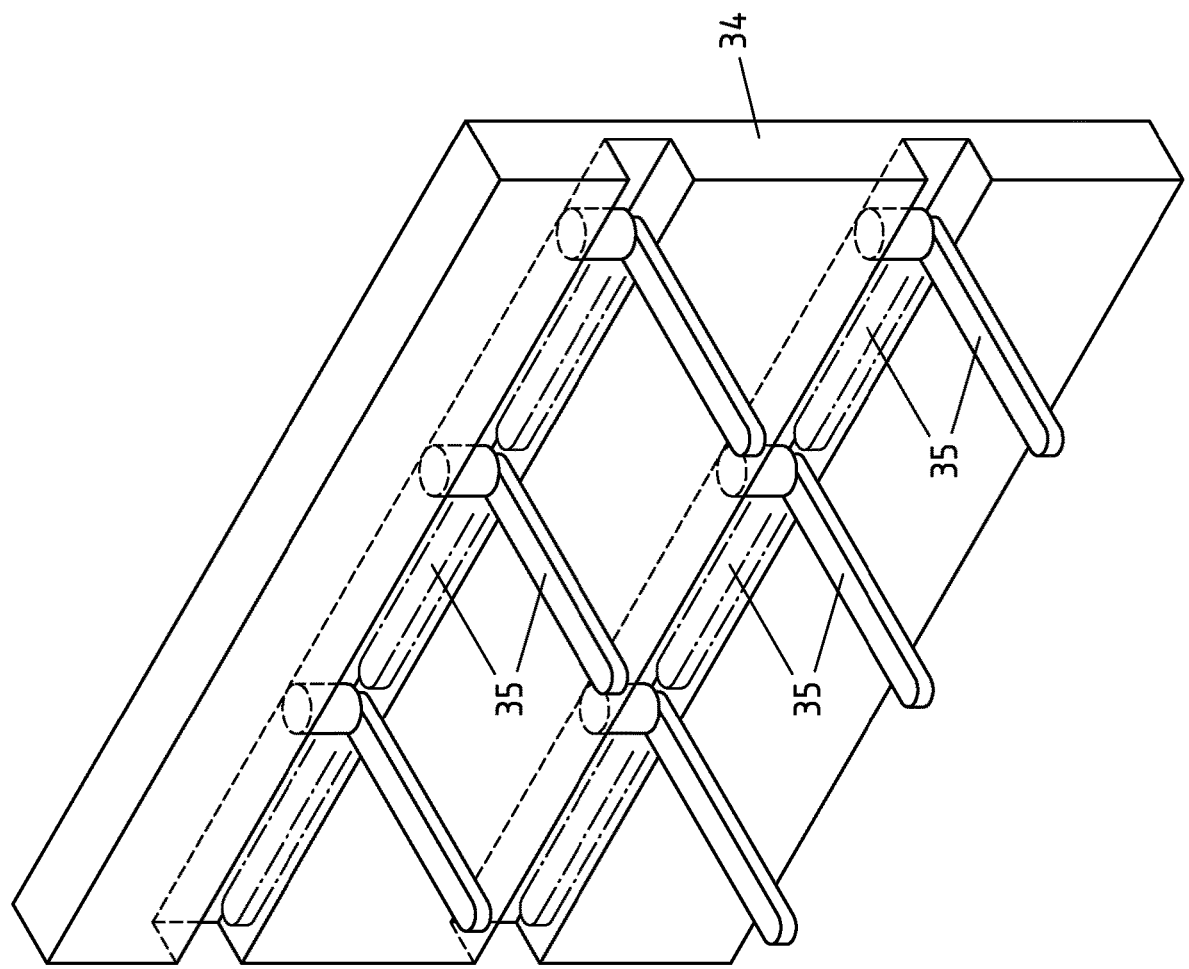
FIG. 5 shows a detail of a rack system of a fourth consignment store according to the invention in a perspective view.

In another embodiment, the rack system 34 may have holding elements 35 in the form of pivot arms which are pivoted out into a use position in order to hold a carrier element and are pivoted in into a non-use position when the holding elements 35 are not required for holding carrier elements, as illustrated in FIG. 5.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context

The invention claimed is:

1. A consignment store for separately accepting, temporarily storing and issuing a plurality of consignments having different dimensions, comprising:
   a handover device for the separate acceptance of consignments and for the handover of the consignments to separate carrier elements,
   a detecting device for detecting height dimensions of the consignments,
   a rack system comprising holding elements which are arranged one above the other in a vertical direction and which define holding levels,
   wherein the holding elements and carrier elements are of corresponding design such that, on at least two adjacent holding levels, two carrier elements carrying in each case one consignment can be held one above the other in a vertical direction, and such that, on at least one holding level, there can be held a carrier element with a consignment taller than the vertical spacing to the next highest holding level,
   wherein at least one control device is provided for allocating carrier elements, which have consignments, in a vertical direction one above the other to different holding elements in a manner dependent on the detected height dimensions of the consignments carried by the carrier elements,
   further comprising an adapting device for adapting at least one of a width dimension or a length dimension of the carrier elements to a respective width dimension or a respective length dimension of the associated consignments.

2. The consignment store according to claim 1, wherein at least one of the width dimension or the length dimension of the carrier elements is adjustable by pulling out and/or pushing in carrier element portions relative to one another.

3. The consignment store according to claim 1, wherein the control device is designed to allocate carrier elements, which have consignments, to storage positions adjacent to one another in a manner dependent on at least one of the width dimension or the length dimension of the carrier elements or of the consignments.

4. The consignment store according to claim 1, wherein the detecting device has a dimension scanner for detecting at least one of height dimensions, width dimensions, or length dimensions of the consignments.

5. The consignment store according to claim 1, further comprising a transport device for transporting the carrier elements, which have consignments, between the handover device and storage positions.

6. The consignment store according to claim 5, wherein the transport device comprises a portal robot for adjusting the carrier elements at least in two mutually perpendicular spatial directions and wherein the portal robot is designed for handing over the carrier elements to the holding elements and/or for removing the carrier elements from the holding elements.

7. The consignment store according to claim 1, wherein the holding elements which define the holding levels have pivot arms for pivoting out into a use position and for pivoting in into a non-use position.

8. The consignment store according to claim 7, wherein the holding elements which define holding levels are displaceable between multiple use positions and/or between at least one use position and at least one non-use position.

9. The consignment store according to claim 7, wherein the holding elements which define holding levels are dismountable.

10. The consignment store according to claim 1, wherein the holding elements which define the holding levels are formed by receptacles for receiving carrier elements carrying consignments, and
    wherein at least one holding level is defined by a single continuous receptacle.

11. The consignment store according to claim 1, wherein the handover device is designed to separately issue consignments that are stored on carrier elements in storage positions.

12. The consignment store according to claim 1, wherein at least one of the adapting device or the carrier elements has at least one stop for abutment against the associated consignment during the pushing-in of carrier element portions and deactivating means for ending the further pushing-in of the carrier element portions.

13. The consignment store according to claim 1, wherein the control device is, for more efficient utilization of the storage space, designed to adjust at least one carrier element carrying a consignment from one storage position to another storage position.

14. The consignment store according to claim 1, wherein the control device is designed to link at least one of pieces of consignment information, height dimensions, width dimensions and/or length dimensions of the consignments to at least one of the carrier elements assigned to the consignments or to the storage positions assigned to the consignments.

15. The consignment store according to claim 1, wherein the detecting device comprises a scanner for detecting pieces of consignment information, the height dimension, the width dimension and/or the length dimension.

16. The consignment store according to claim 15, wherein the scanner comprises at least one of a barcode scanner, an RFID reader unit, or an NFC reader unit.

17. The consignment store according to claim 1, wherein the handover device comprises a carrier element store for temporarily storing unused carrier elements.

18. A method for operating a consignment store for separately accepting, temporarily storing, and issuing a plurality of consignments having different dimensions, comprising the steps of:
    separately accepting consignments by means of a handover device and handing over the consignments to separate carrier elements,
    detecting height dimensions of the consignments by means of a detecting device,
    allocating the carrier elements which have consignments, by means of a control device, in a manner dependent on the detected height dimensions, to holding elements, which define holding levels provided one above the other in a vertical direction, of a rack system such that, on at least some holding levels, carrier elements with a consignment taller than the vertical spacing to the next highest holding level in the vertical direction are arranged one above the other, and
    adapting at least one of a width dimension or a length dimension of the carrier elements, in an adapting device, to a respective width dimension or a respective length dimension of the associated consignments.

19. The method according to claim 18, further comprising the steps of:

adjusting at least one of the width dimension or the length dimension of the carrier elements by pulling-out or pushing-in of carrier element portions relative to one another, and pushing in the carrier element portions until at least one stop of the adapting device or of the carrier element abuts against the associated consignment, and a deactivating means ends the further pushing-in of the carrier element portions.

20. The method according to claim 18, further comprising the steps of:

allocating carrier elements which have consignments, in a manner dependent on at least one of the width dimension or the length dimension of the carrier elements or of the consignments, by the control device to storage positions adjacent to one another, resorting carrier elements carrying consignments, in relation to the respective storage positions, in a manner predetermined by the control device for the purposes of more efficiently utilizing the available storage space, and assigning pieces of consignment information, height dimensions, width dimension or length dimension, of the consignments by the control device to the carrier elements to the consignments, or to the storage positions assigned to the consignments or carrier elements.

21. The method according to claim 6, further comprising the steps of:

detecting at least one of height dimensions, width dimensions or length dimensions of the consignments being handed over to the consignment store by means of a dimension scanner of a detecting device, and detecting pieces of consignment information, height dimensions, width dimensions and/or length dimensions, of the consignments being handed over to the consignment store by means of a scanner of the detecting device, wherein the scanner comprises at least one of a barcode scanner, an RFID reader unit or an NFC reader unit.

22. The method according to claim 18, further comprising the steps of:

transporting the carrier elements which have the consignments by means of a transport device between the handover device and storage positions, and moving the carrier elements, by means of a portal robot of the transport device, at least in two mutually perpendicular spatial directions.

23. The method according to claim 18, further comprising the steps of:

introducing and the carrier elements carrying consignments, at least in portions, into held in positively locking fashion in the holding elements which define holding levels and which are in the form of receptacles, issuing the consignments stored with carrier elements in storage positions separately by means of the handover device, and temporarily storing the unused carrier elements in a carrier element store until they are used again.

24. An adapting device configured to reversibly receive a plurality of carrier elements and to adapt at least one of a width dimension or a length dimension of the carrier elements to at least one respective width dimension or respective length dimension of consignments to be carried by the carrier elements, wherein at least one of the width dimension or the length dimension of the carrier elements is adjustable by pushing-in of carrier element portions relative to one another, and wherein at least one of the adapting device or the carrier elements comprises at least one stop for abutment against the associated consignment during the pushing-in of carrier element portions and deactivating means for ending further pushing-in of the carrier element portions.

* * * * *

UNITED STATES PATENT AND TRADEMARK OFFICE
CERTIFICATE OF CORRECTION

PATENT NO. : 10,974,915 B2
APPLICATION NO. : 16/245015
DATED : April 13, 2021
INVENTOR(S) : Christoph Dautz et al.

Page 1 of 1

It is certified that error appears in the above-identified patent and that said Letters Patent is hereby corrected as shown below:

In the Claims

Column 17 Line 6 Claim 19, reads "stop of the adapting device or of the carrier element" and should read --stop of the adapting device and/or of the carrier element--

Column 17 Line 14 Claim 20, reads "sion or the length dimension of the carrier elements or" and should read --sion or the length dimension of the carrier elements and/or--

Column 17 Line 25 Claim 20, reads "elements to the consignments, or to the storage posi-" and should read --elements to the consignments, and/or to the storage posi- --

Column 17 Line 26 Claim 20, reads "tions assigned to the consignments or carrier elements." and should read --tions assigned to the consignments and/or carrier elements.--

Signed and Sealed this
Third Day of August, 2021

Drew Hirshfeld
*Performing the Functions and Duties of the
Under Secretary of Commerce for Intellectual Property and
Director of the United States Patent and Trademark Office*